United States Patent Office 3,700,579
Patented Oct. 24, 1972

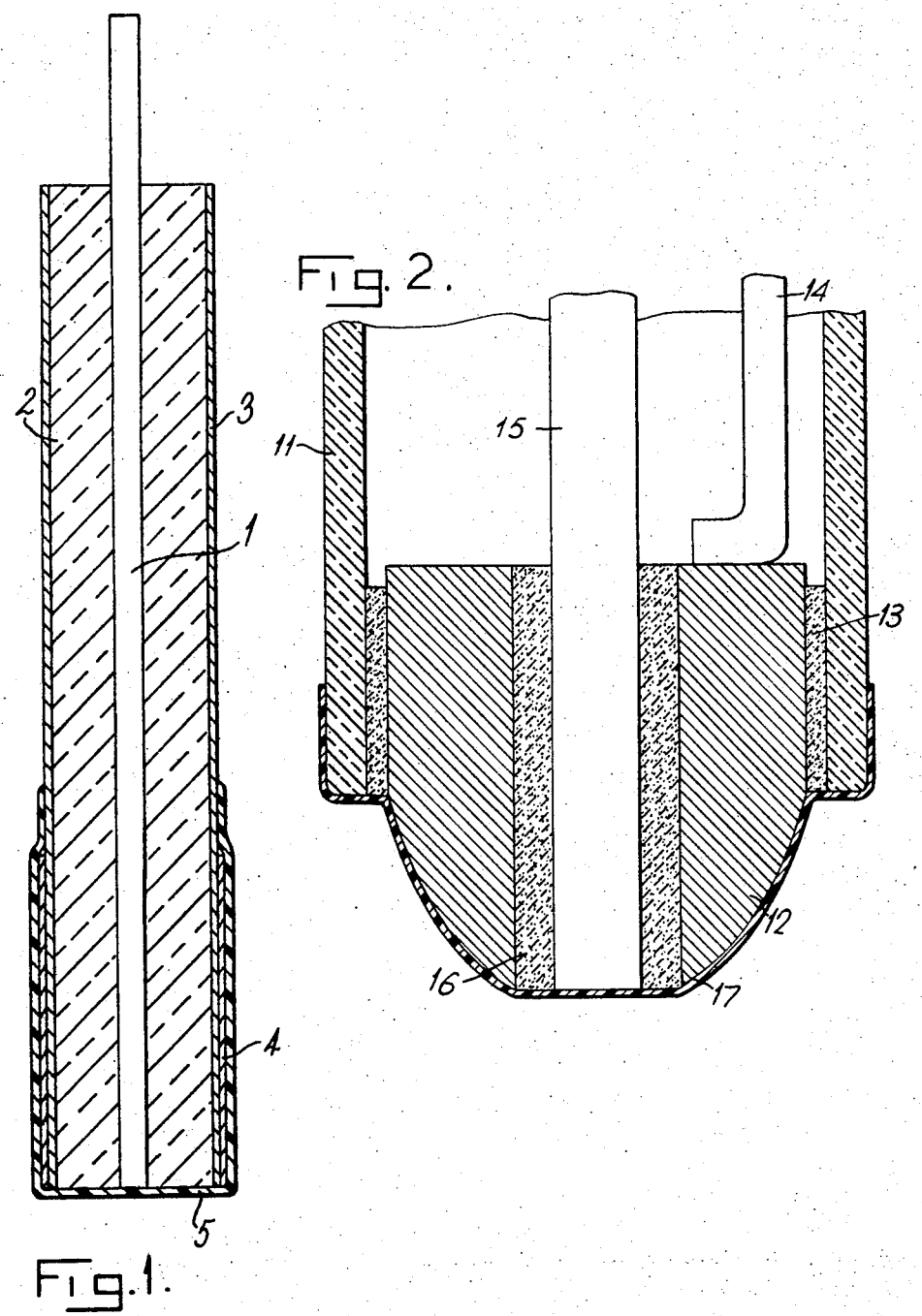

3,700,579
APPARATUS FOR MEASURING THE CONCENTRATION OF DISSOLVED OXYGEN IN AN AQUEOUS SOLUTION
John Stephen Clifton, Harpenden, and Dawood Parker, London, England, assignors to National Research Development Corporation, London, England
Filed Mar. 4, 1971, Ser. No. 121,077
Claims priority, application Great Britain, Mar. 12, 1970, 11,949/70
Int. Cl. G01n 27/46
U.S. Cl. 204—195 P
6 Claims

ABSTRACT OF THE DISCLOSURE

A membrane of a fluorocarbon polymeric material is arranged in contact with two electrodes so that an electrochemical cell will be formed when water with an appropriate ion content is absorbed by the membrane. In use the characteristics of the cell are affected by oxygen diffusing into the membrane from a solution under investigation.

---

This invention relates to apparatus for measuring the concentration of dissolved oxygen in an aqueous solution.

A known form of apparatus of this kind comprises a pair of electrodes, an electrolytic medium in contact with both electrodes so as to form an electrochemical cell (which may be a voltaic cell or a polarographic cell), and a membrane which is permeable to oxygen and is arranged with one face in contact with said medium and the other face exposed for contact with a solution to be investigated; in the operation of this form of apparatus, a solution under investigation is separated from the cell by the membrane, through which oxygen diffuses into the cell so as to affect its characteristics to an extent dependent on the concentration of oxygen in the solution. With this known form of apparatus the response to changes in oxygen concentration in a solution under investigation is usually relatively slow, and it is accordingly an object of the invention to provide apparatus of the kind specified which is improved in this respect.

Apparatus of the kind specified is commonly used for determining the oxygen tension of biological fluids such as blood, and for this purpose it is desirable that the apparatus should be readily amenable to steam sterilisation. This is, however, somewhat difficult to achieve with the known form of apparatus referred to.

In accordance with the invention the known form of apparatus referred to above is modified by omitting the conventional electrolytic medium, by making the membrane of a fluorocarbon polymeric material, and by arranging the membrane in contact with both electrodes.

Thus, an apparatus according to the invention comprises a pair of electrodes spaced from each other and a membrane of a fluorocarbon polymeric material having one face in contact with both electrodes and the other face exposed for contact with a solution to be investigated.

It is to be understood that the term "fluorocarbon polymeric material" is to be interpreted as embracing chlorinated fluorocarbon polymers and as admitting of the inclusion in the material of minor blending agents.

It has been found that membranes of such polymeric materials are capable of absorbing water, and as a result an apparatus according to the invention may be activated for use by bringing the membrane into contact for a sufficient time with an aqueous solution containing a concentration of hydroxyl ions such that an electrochemical cell will be constituted by virtue of the water absorbed by the membrane; it will be found that solutions of the kind which are commonly investigated using such an apparatus contain an adequate concentration of hydroxyl ions for this purpose, in which case the apparatus may simply be activated by means of a solution of the kind which is to be investigated. It may, however, be preferred to provide within the apparatus itself a source of hydroxyl ions which will diffuse into the membrane when it absorbs water, for example in the form of crystals of a suitable substance disposed in contact with the membrane; in this case the apparatus may be activated for use by bringing the membrane into contact for a sufficient time with water (which may be pure) in either the liquid or the vapour state, the latter normally being preferred because a shorter time is required to complete the activation. In particular the activation can be brought about by subjecting the apparatus to a conventional process of steam sterilisation, which presents no problems because of the omission of the conventional electrolytic medium and the nature of the material used for the membrane.

In use the characteristics of the cell thus constituted will be affected by oxygen diffusing into the membrane, and it will be appreciated that the distance the oxygen has to travel before taking effect may be made relatively small, so as to ensure a rapid response to changes in oxygen concentration in a solution under investigation; by making the membrane sufficiently thin, it is possible to achieve response times of the order of 0.1–1 second. In the case where no internal source of ions is provided in the apparatus, it is found that the characteristics of the cell may be dependent on the pH value of the solution in which the apparatus is used; in this case, therefore, the use of the apparatus may need to be restricted, if reliable results are to be obtained, to solutions whose pH values are substantially invariant. The possible sensitivity of the pH value of the solution is much less in the case where an internal source of ions is provided, and can be reduced to insignificance in this case by increasing the thickness of the membrane (with a consequent sacrifice in respect of the response time and the ease of activation of the apparatus). In both cases, of course, if absolute measurements of oxygen concentration are required the apparatus must first be calibrated using a standardised solution. Having regard to the factors discussed above, a suitable value for the thickness of the membrane will normally be of the order of 0.001 inch.

The membrane may be formed in situ by a process involving coating portions of the surface of the electrodes with the material of the membrane; alternatively the membrane may be preformed and then secured in position in contact with the electrodes by means of a suitable adhesive. The former alternative will be preferred in many cases as being more convenient and as making possible the use of a thinner membrane than would be feasible if the membrane were preformed. The use of a preformed membrane may, however, be indicated where it is desired to use in the apparatus materials which will not readily withstand temperatures of the order required to effect appropriate coating processes. Where a preformed membrane is used, it is possible that a very thin film of water may be formed on the electrode side of the membrane when the apparatus is activated; this will not normally have any significant effect on the characteristics of the cell, except for a possible slight increase in the response time. Where the membrane is formed in situ the existence of such a film of water would appear to be precluded.

The electrodes may suitably be of materials such that they are respticevly adapted to constitute the cathode and anode of a voltaic cell completed by the electrolyte held in the membrane; with this arrangement the output of, or the maximum current that may be drawn from the cell will be dependent upon (normally linearly proportional to) the oxygen concentration in a solution under investigation, by virtue of a reaction involving the diffused oxygen at the interface between the cathode and the membrane. The cathode may for example be of platinum or silver and the anode of zinc or lead.

Two arrangements in accordance with the invention will now be described by way of example with reference to the accompanying drawings, in which:

FIG. 1 is a sectional view of a device specifically intended for measuring the oxygen tension of blood in vivo; and FIG. 2 is a sectional view of part of a probe generally useful for measuring the oxygen tension of a biological fluid.

Referring to FIG. 1, the device shown therein comprises a platinum wire 1 of diameter 0.15 millimetre on which is formed a sheath 2 of borosilicate glass having a diameter of one millimetre, one end of the wire 1 being flush with the corresponding end of the sheath 2 and the other end of the wire 1 projecting from the sheath 2. On the cylindrical surface of the sheath 2 is formed a thin conducting coating 3 which extends over the whole length of the sheath 2. A thin coating 4 of zinc is superimposed on part of the coating 3, the coating 4 extending along a portion of the length of the sheath 2 adjacent the end with which the wire 1 is flush. In use of the device the coating 4 constitutes the anode of a voltaic cell the cathode of which is constituted by the wire 1; the conducting coating 3 serves as a connection for the zinc coating 4.

In the manufacture of the device, when the structure so far described has been fabricated, the end of the structure at which the coating 4 is formed is wetted with a saturated solution of potassium carbonate with the potassium bicarbonate, which is then allowed to dry to leave on the surface minute crystals which subsequently serve as a source of hydroxyl ions. This end of the structure is then dipped, to a depth beyond the length of the coating 4, into a polytetrafluoroethylene dispersion of the kind sold under the trade name "Teflon 30B" and the structure is then first dried by heating to 70° to 80° C. and subsequently heated in an oven at 360° C. to sinter the polytetrafluoroethylene. The dipping and heating are repeated three times, and as a result there is formed a membrane 5 of polytetrafluoroethylene having a thickness of about 25 microns which covers the end surfaces of the wire 1 and the sheath 2 and the whole of the coating 4.

The device shown in FIG. 1 is intended to be inserted in the end of a catheter (not shown) with the end covered by the membrane 5 projecting, so that it may be introduced into a blood vessel, the catheter having disposed within it leads which are respectively connected to the projecting end of the wire 1 and the conducting coating 3. Before use the device is subjected to a standard steam sterilisation process involving autoclaving for about 20 minutes, this serving also to activate the device by completing the required electrochemical cell.

Referring now to FIG. 2, the probe shown therein comprises a glass tube 11 having a diameter of about three millimetres, within one end of which is disposed a lead pellet 12 having a projecting tapered nose, pellet 12 being secured in position by means of an epoxy resin 13 and having secured to it a connecting wire 14 which passes through the tube 11. The pellet 12 has formed in it a central hole of diameter one millimetre within which is centrally disposed one end of a silver wire 15 of diameter 0.5 millimetre, the wire 15 also extending through the tube 11; the wire 15 is secured in the hole in the pellet 12 by means of an epoxy resin 16 with its end surface flush with the free end of the pellet 12. In use of the probe, the pellet 12 and wire 15 respectively serve as the anode and cathode of a voltaic cell.

To the end of the structure so far described is applied a closely fitting membrane 17 of polytetrafluoroethylene, which covers the end surface of the wire 15, the projecting portion of the pellet 12 and the adjacent end of the tube 11, the membrane 17 being secured to the tube 11 by means of a silicone rubber adhesive. The membrane 17 in this case is preformed because the nature of the materials used in the structure makes it unsuitable for subjecting to a temperature such as is used in forming the membrane 5 in the device of FIG. 1. The membrane 17 is initially formed on a polished brass former similar in shape to the probe but of slightly smaller dimensions so that the membrane 17 is slightly stretched when applied to the probe. A similar process is used to that used for forming the membrane 5, involving repeatedly dipping the former in a polytetrafluoroethylene dispersion, drying and sintering; since the membrane 17 has to be handled separately, it is desirable that it should be somewhat stouter than the membrane 5 and this is achieved by carrying out the dipping, drying and sintering operations a total of six times.

If an internal source of hydroxyl ions is required this can be provided by treating the pellet 12 with a potassium carbonate-potassium bicarbonate solution before application of the membrane 17; this will not be necessary if the probe is required solely for use in investigating solutions of high and constant pH value. Before use the probe is sterilised in the same manner as for the device shown in FIG. 1, this also serving to activate the probe where an internal source of hydroxyl ions is provided. Where no such source is provided activation will require exposure to a solution containing an appropriate concentration of hydroxyl ions.

Alternative materials which could be used in place of polytetrafluoroethylene for the membranes 5 and 17 are fluorinated ethylene polymers and chlorinated fluorocarbon polymers such as polytrifluorochloroethylene.

We claim:

1. An apparatus for use in measuring the concentration of dissolved oxygen in an aqueous solution, said apparatus comprising:
   a solid structure incorporating a pair of electrodes and means holding said electrodes in spaced apart, insulated relationship; and
   a fluorocarbon polymeric material membrane having first and second faces, said first face being in direct contact with parts of said solid structure, including both of said electrodes, without the inclusion of any liquid material between said electrodes and said first face of the membrane, and said second face being exposed for contact with a solution to be investigated.

2. An apparatus according to claim 1, further comprising a source of hydroxyl ions which will diffuse into the membrane when it absorbs water.

3. An apparatus according to claim 1, in which said electrodes are respectively adapted to constitute the cathode and anode of a voltaic cell.

4. An apparatus according to claim 1, in which said electrodes are disposed coaxially at one end of a cylindrical structure and are covered by the membrane.

5. An apparatus according to claim 1, in which the membrane is of polytetrafluoroethylene.

6. An apparatus according to claim 1 in which said membrane is adhered to said structure over the whole area of the membrane.

References Cited

UNITED STATES PATENTS

| | | | |
|---|---|---|---|
| 3,088,905 | 5/1963 | Glover | 204—195 P |
| 3,098,813 | 7/1963 | Beebe et al. | 204—195 P |
| 3,380,905 | 4/1968 | Clark | 204—195 P |
| 3,394,069 | 7/1968 | Solomons | 204—195 P |
| 3,575,836 | 4/1971 | Sternberg | 204—195 P |

FOREIGN PATENTS

| | | | |
|---|---|---|---|
| 1,040,823 | 9/1966 | Great Britain | 204—195 P |

TA-HSUNG TUNG, Primary Examiner

U.S. Cl. X.R.

204—1 T